(No Model.) 2 Sheets—Sheet 2.
H. I., P. F. & H. G. CHASE.
PROCESS OF DRYING GRAIN.
No. 322,257. Patented July 14, 1885.
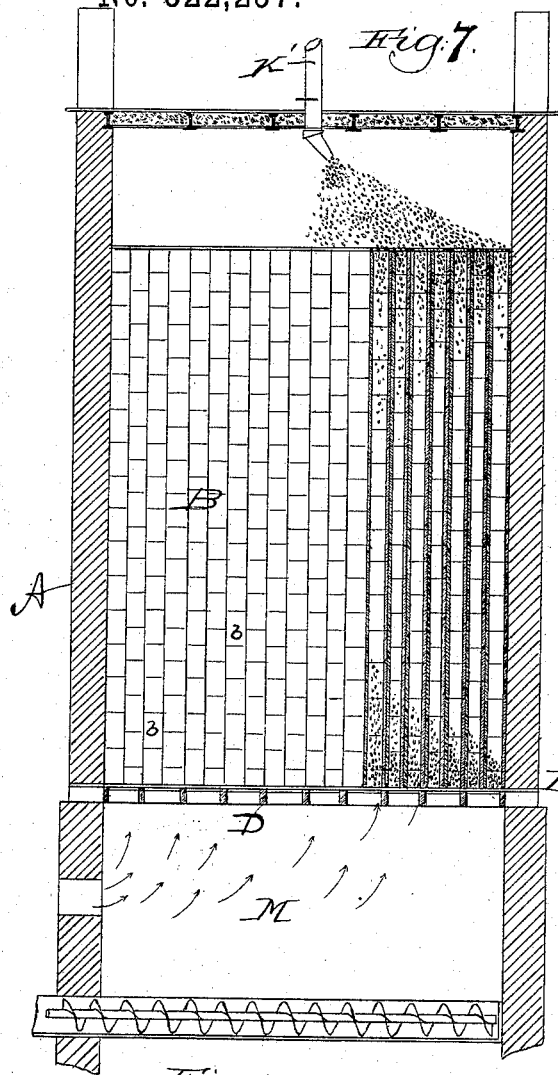
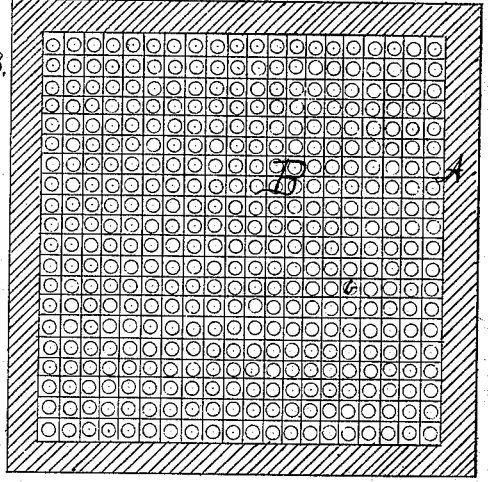
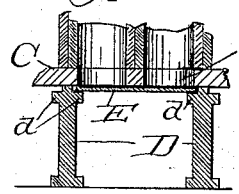
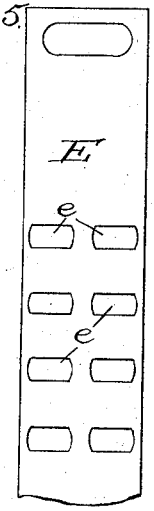
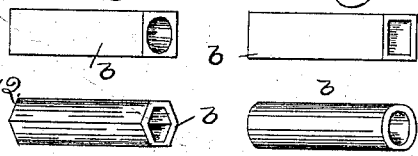
Witnesses
A. M. Munday
Lew. E. Curtis
Inventors
Henry I. Chase
Philander F. Chase
Henry G. Chase
by Munday Evarts & Adcock
their Attys
N. PETERS, Photo-Lithographer, Washington, D. C.

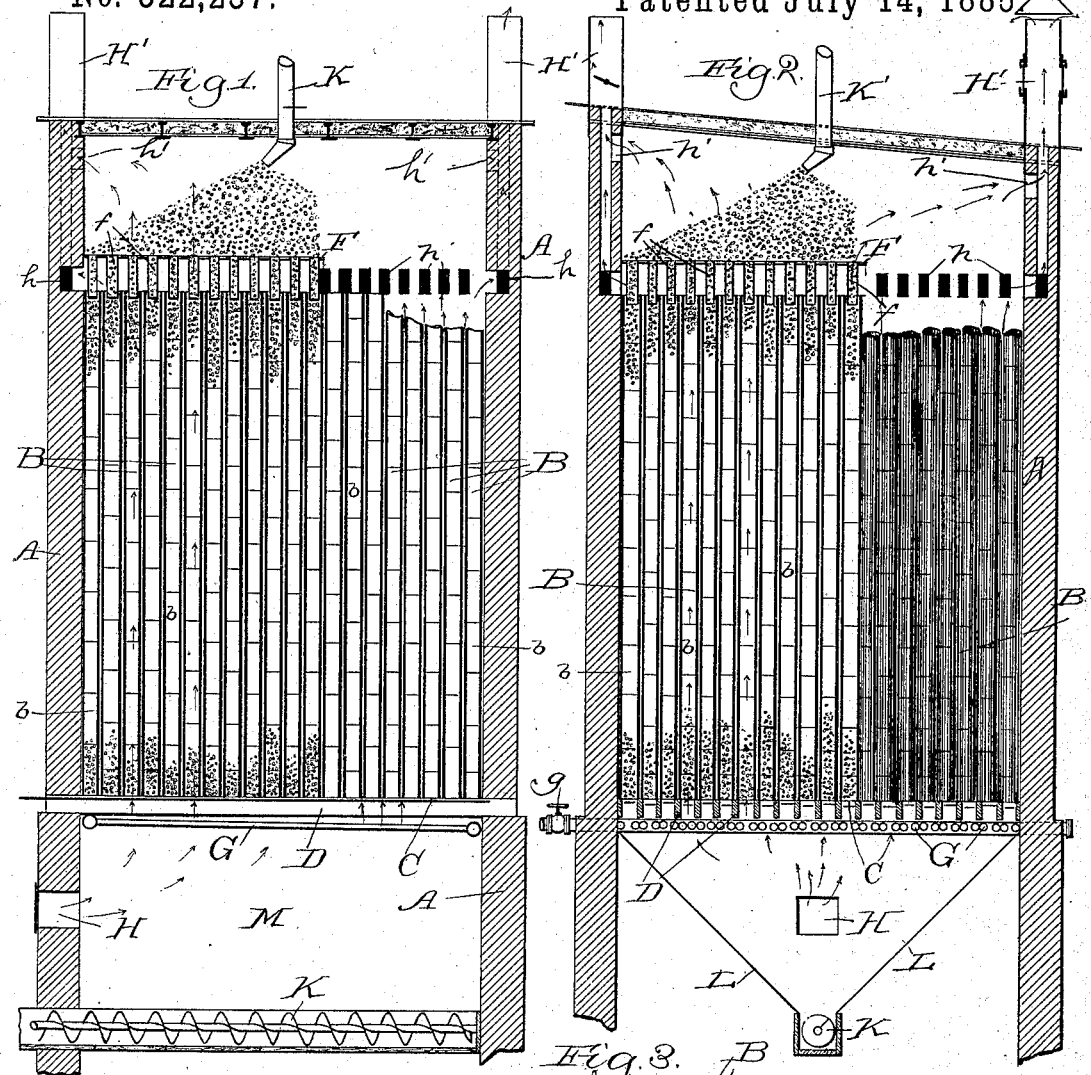
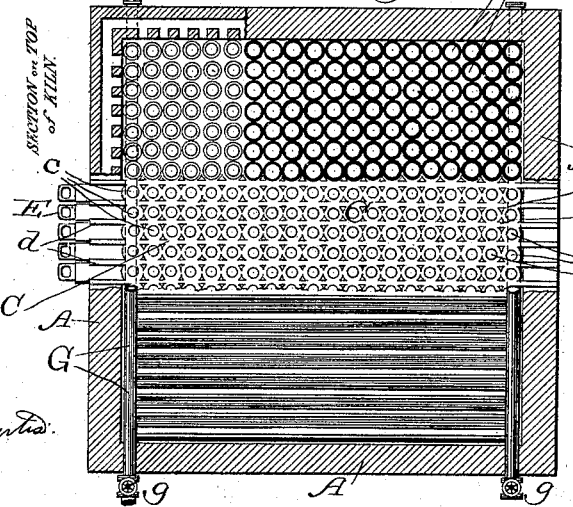

UNITED STATES PATENT OFFICE.

HENRY I. CHASE, PHILANDER F. CHASE, AND HENRY G. CHASE, OF CHICAGO, ILL., ASSIGNORS TO THE CHASE ELEVATOR COMPANY, OF SAME PLACE.

PROCESS OF DRYING GRAIN.

SPECIFICATION forming part of Letters Patent No. 322,257, dated July 14, 1885,

Application filed November 24, 1884. (No model.)

*To all whom it may concern:*

Be it known that we, HENRY I. CHASE, PHILANDER F. CHASE, and HENRY G. CHASE, citizens of the United States, residing in Chicago, in the county of Cook and State of Illinois, have invented a new and useful Improvement in Processes of Drying Grain, of which the following is a specification.

Heretofore grain has been dried by absorption by placing the damp grain in contact with dry absorbent material, like brick or burned-clay tiling, the moisture being at the same time removed from or driven out of the absorbent material by exposing its opposite surface to heat or currents of dry hot air. This method is not only slow and tedious, owing to the fact that the grain is always exposed to the moister side or surface of the tile, while the heat or hot air to dry the tile is always exposed to the dryer surface of the same; but this old method is also attended with great danger of scorching or tainting the grain, if at any time a little too high heat happens to be employed. The heat being applied to one surface of the tile while the grain is in contact with the opposite surface of the same, also tends in a measure to drive the moisture back into the grain.

The object of our present improvement is to provide a process for drying damp grain rapidly, cheaply, and in large quantities, and without any danger of tainting or injuring the grain by exposing it to too great heat; and to this end our invention consists in drying the grain by absorption by exposing it to a dry porous absorbent material for the requisite length of time, then removing the grain from the absorbent material, and finally drying the absorbent material after the grain is separated therefrom. In this way as the absorbent material is dried after being separated from the grain, there can be no danger of tainting or scorching any portion of the grain by the heat, as the grain need not be exposed thereto at all; and while the absorbent material is being dried any desired degree of heat can be applied thereto, so that it may be done very quickly; and as the grain is removed from the absorbent material before the latter is dried, the heat or dry air is, according to our invention, applied to the same surface of the absorbent material with which the grain was in contact, which very much facilitates both the step of drying the absorbent material and also the previous step of drying the grain by absorption, as the grain is in this way always applied to a well-dried surface of the tile, and as the heat or dry air comes in contact with that part of the tile or other absorbent material which contains the greatest amount of moisture. This is a feature of special importance, because frequently the moisture absorbed from the grain will only penetrate a half inch, or such matter, into the absorbent material, and as the absorbent material is a poor conductor of heat, it is not readily or quickly heated through from the opposite side and dried.

In practicing our improved process in drying the burned-clay tile, or other absorbent material employed after the grain is removed therefrom, heat or currents of dry air may be applied both to the surface with which the moist grain was in contact and the opposite surface also, or the heat or dry air may be applied only to the former, as may be preferred.

In the accompanying drawings, which form a part of this specification, and in which similar letters of reference indicate like parts, we have shown, for the purpose of better illustrating the method of practicing our process and invention, a suitable apparatus or kiln which may be used therefor.

In said drawings, Figure 1 is a vertical sectional view of such apparatus. Fig. 2 is a similar sectional view at right angles to Fig. 1, showing some of the burned clay tiling-tubes in elevation. Fig. 3 is a cross or horizontal section taken in part at different points. Fig. 4 is an enlarged vertical sectional view, showing the support for the tile. Fig. 5 is a plan view of the slide or gate to open and close the tiling-tubes. Fig. 6 is a plan view of a section of the floor on which the tile rest. Fig. 7 is a vertical section, showing an apparatus for practicing our invention, wherein no interstices are left between the tiling-tubes, and wherein the tile are of course dried by exposing only the inner surface of the same with which the grain was in contact to hot or dry air. Fig. 8 is a cross-section of Fig. 7. Fig. 9 is an enlarged perspective view of one of the tile-sections as employed in the apparatus shown in Figs. 1, 2, and 3, and Fig. 10 is a similar view of a tile-section such as employed in the apparatus shown in Figs. 7 and 8, and Figs. 11 and 12 are similar views of modified forms of tile-sections.

In said drawings, A represents the walls of the kiln or bin, and B the dry absorbent material for the grain to come in contact with. The absorbent material we prefer to employ is burned-clay tiling, and the different sections b thereof are placed in the kiln, one on top of another, to form continuous tiling tubes extending from the bottom to the top of the kiln or bin; and they are also placed in close contiguity to each other laterally, so that the several columns or tiers of tile will be self-bracing and self-sustaining.

C represents the floor resting upon the joists D. This floor C may preferably be made of iron plates or sheets, and is provided with a series of openings, c, registering with the interior of the tile. A slide or gate, E, is supported in suitable guides or projections, d, on the joists D immediately under the floor C, so as to close the openings therein. The slides E are also provided with valves or openings e to withdraw the grain from the tile when the slide is moved so that the openings e register with the openings c in the floor. As shown in Figs. 1, 2, and 3, the tile employed are cylindrical in form, and interstices are left between the adjacent tile. Openings c' may be provided in the floor to register with these interstices, so that during the step of drying the tile heat or dry hot air may be applied upon both the inside and the outside of the tile. To prevent the grain in this construction, where interstices are left between the tiles, from falling into such interstices, we provide a supplemental floor, F, provided with tubes or funnels f, which register with the tile tubes and direct the grain into the same, as shown in Figs. 1 and 2. If no such interstices are left between the tile, as shown in Figs. 7 and 8, or if the interstices are filled up this supplemental floor with its tubes or funnels is, of course, not necessary.

G represents a steam-coil arranged below the joist for the purpose of heating and drying the air to dry the tile, and g is a steam-cock for letting on and turning off the steam.

H represents an air-port connecting with a fan or blower, (not shown in the drawings,) for producing a rapid and free circulation of air through all the tubes, and H' represents the exhaust-flues, extending out through the walls of the building. It will be observed that these flues H' have ports h h' in Figs. 1 and 2, which communicate both with the hollow tile and the spaces between them.

K represents a conveyer for removing the grain after it is dried, and K' is the spout of an elevator by which the moist grain is delivered to the kiln to be dried.

In operation the tiling tubes in the bin are first filled with the moist grain. The tile then absorbs the moisture from the grain, and then the charge of dry grain is removed by opening the slides, when the heat is turned on and the tile dried out by the currents of dry air which pass up through the tubes, thus coming in contact with the same surface thereof with which the moist grain was in contact. In Figs. 1, 2, and 3 it will be observed that the dry air may also come in contact with the external surface of the tile.

By placing the adjacent tile in close contiguity with each other the separate sections of tile are held rigid and in their proper position, so as to form a continuous tube, and these continuous columns of tile are each braced by the others which surround it and with which it is in contact at three or more points.

L represents inclined sides or chutes for directing the dried grain into the conveyer K.

It will be observed that a large open space or chamber, M, is provided below the floor upon which the tile rest, so that the air-currents forced into the same from the fan or blower will be broken and distributed over the whole lower surface of the floor, and so that all the tiling tubes in every part of the bin will receive an equal supply of the dry air; and for this purpose of preventing an unequal passage of the air through some of the tubes we distribute and arrange the steam-coil by which the air is heated immediately under the open floor upon which the tile rest, so that the hot air, as it leaves the steam-coil, will naturally pass directly up and enter the tile tube immediately above. By this arrangement of the steam-coil, in connection with the open chamber M below the tile, we succeed in causing the hot dry air to pass up evenly through all the tile tubes and to dry them all alike.

We make no claim herein to the apparatus herein shown and described, as the same forms the subject-matter of a separate application.

We claim—

1. The process or method of drying grain, consisting in first absorbing the moisture from the grain by placing it in contiguity with dry absorbent material for the requisite length of time, then separating the grain from the absorbent material, and finally drying the absorbent material, substantially as specified.

2. The process or method of drying grain, consisting in first absorbing the moisture from the grain by dry burned-clay tiling, then removing the dried grain from the tiling, and finally drying the tiling by exposing the surface of the same with which the moist grain was in contact to a current of dry heated air, substantially as specified.

HENRY I. CHASE.
PHILANDER F. CHASE.
HENRY G. CHASE.

Witnesses:
EDMUND ADCOCK,
H. M. MUNDAY.